US012756301B2

(12) United States Patent
Takeuchi

(10) Patent No.: US 12,756,301 B2
(45) Date of Patent: Oct. 6, 2026

(54) FORWARD DC-DC CONVERTER

(71) Applicant: KABUSHIKI KAISHA TOYOTA JIDOSHOKKI, Aichi-ken (JP)

(72) Inventor: Daisuke Takeuchi, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 160 days.

(21) Appl. No.: 18/818,830

(22) Filed: Aug. 29, 2024

(65) Prior Publication Data

US 2025/0088099 A1 Mar. 13, 2025

(30) Foreign Application Priority Data

Sep. 12, 2023 (JP) ................................ 2023-147533

(51) Int. Cl.
*H02M 3/335* (2006.01)
*H01F 27/28* (2006.01)
*H02M 3/00* (2006.01)

(52) U.S. Cl.
CPC ............ *H02M 3/003* (2021.05); *H01F 27/28* (2013.01); *H02M 3/33538* (2013.01)

(58) Field of Classification Search
CPC .......................... H02M 3/003; H02M 3/33538
See application file for complete search history.

(56) References Cited

U.S. PATENT DOCUMENTS

2019/0320554 A1* 10/2019 Nakajima ............... H01F 27/22
2020/0294708 A1* 9/2020 Ishizawa ........... H02M 3/33573
2024/0063721 A1* 2/2024 Xiang ............... H02M 3/33569
2024/0120146 A1 4/2024 Yeom et al.
2024/0387095 A1* 11/2024 Hayase ............ H02M 3/33573

FOREIGN PATENT DOCUMENTS

CN 201266888 Y 7/2009
JP 2016-131464 A 7/2016
WO WO2022/169236 A1 8/2022

* cited by examiner

*Primary Examiner* — Alex Torres-Rivera
(74) *Attorney, Agent, or Firm* — Greenblum & Bernstein, P.L.C.

(57) ABSTRACT

A converter includes a core around which a primary winding and a secondary winding of a transformer, as well as a smoothing coil, are wound. A core includes a first base; a second base; an intermediate portion located between the first base and the second base, a first middle leg which is located between the first base and a third core component and around which the primary winding and the secondary winding are wound, a second middle leg which is located between the second base and the intermediate portion and around which the smoothing coil is wound. A winding direction of the primary winding from a first end toward a second end, a winding direction of the secondary winding from a third end toward a fourth end, and a winding direction of the smoothing coil from a fifth end toward a sixth end are identical.

3 Claims, 5 Drawing Sheets

FORWARD DC-DC CONVERTER

BACKGROUND

1. Field

The present disclosure relates to a forward DC-DC converter.

2. Description of Related Art

Japanese Laid-Open Patent Publication No. 2016-131464 discloses a forward DC-DC converter. The forward DC-DC converter includes a transformer and a smoothing reactor. The transformer includes a transformer core, a primary winding, and a secondary winding. The transformer core includes two core components. The primary winding and the secondary winding are each wound around the transformer core. The smoothing reactor includes a smoothing reactor core and a smoothing coil. The reactor core includes two core components. The smoothing coil is electrically connected to the secondary winding. The smoothing coil is wound around the smoothing reactor core.

Such a forward DC-DC converter needs to be reduced in size.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A forward DC-DC converter according to an aspect includes a transformer including a primary winding and a secondary winding, a switching element electrically connected to the primary winding, a rectifier circuit electrically connected to the secondary winding, a smoothing reactor including a smoothing coil, the smoothing coil being electrically connected to the secondary winding, and a core around which the primary winding, the secondary winding, and the smoothing coil are wound. The core includes a first base, a second base, an intermediate portion located between the first base and the second base, a first middle leg which is located between the first base and the intermediate portion and around which the primary winding and the secondary winding are wound, two first outer legs located respectively on opposite sides of the first middle leg between the first base and the intermediate portion, a second middle leg which is located between the second base and the intermediate portion and around which the smoothing coil is wound, and two second outer legs located respectively on opposite sides of the second middle leg between the second base and the intermediate portion. One end of the primary winding is a first end electrically connected to a positive electrode of a direct-current power supply, and the other end of the primary winding is a second end electrically connected to a negative electrode of the direct-current power supply. One end of the secondary winding is a third end electrically connected to a positive input terminal of the rectifier circuit, and the other end of the secondary winding is a fourth end electrically connected to a negative input terminal of the rectifier circuit. One end of the smoothing coil is a fifth end electrically connected to a positive output terminal of the rectifier circuit, and the other end of the smoothing coil is a sixth end electrically connected to a negative output terminal of the rectifier circuit. A winding direction of the primary winding from the first end toward the second end, a winding direction of the secondary winding from the third end toward the fourth end, and a winding direction of the smoothing coil from the fifth end toward the sixth end are identical.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A forward DC-DC converter according to an embodiment will now be described with reference to FIGS. 1 to 5. In the following description, the forward DC-DC converter will be simply referred to as the converter.

Figure 1:
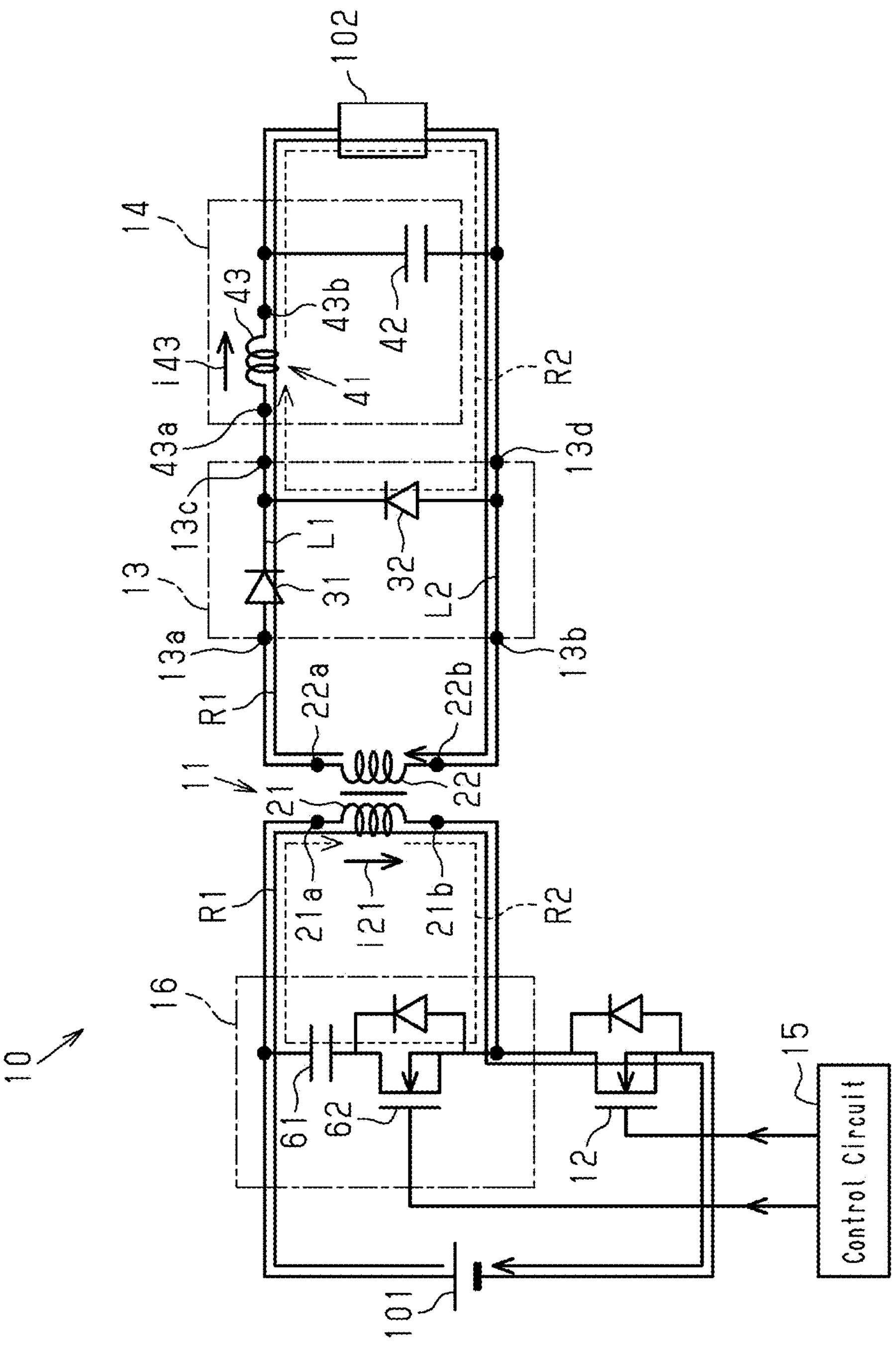
FIG. 1 is a circuit diagram showing a forward DC-DC converter according to an embodiment.

As shown in FIG. 1, a direct-current power supply 101 is connected to the input of the converter 10. A load 102 is connected to the output of the converter 10. The converter 10 transforms the direct-current power from the direct-current power supply 101 and supplies the transformed power to the load 102. The direct-current power supply 101 of the present embodiment is a high-voltage battery. The converter 10 in the present embodiment steps down the voltage of the direct-current power from the high-voltage battery and supplies it to the load 102.

The converter 10 includes a transformer 11, a main switching element 12 serving as a switching element, a rectifier circuit 13, a smoothing circuit 14, and a control circuit 15. The converter 10 of the present embodiment further includes an active clamp circuit 16. Thus, the converter 10 in the present embodiment is a forward DC-DC converter in an active clamp mode.

The transformer 11 includes a primary winding 21 and a secondary winding 22. The primary winding 21 has a first end 21*a* and a second end 21*b*. The first end 21*a* is one end of the primary winding 21, and the second end 21*b* is the other end of the primary winding 21. The first end 21*a* of the primary winding 21 is electrically connected to a positive terminal of the direct-current power supply 101. The secondary winding 22 has a third end 22*a* and a fourth end 22*b*. The third end 22*a* is one end of the secondary winding 22, and the fourth end 22*b* is the other end of the secondary winding 22. In the present embodiment, the number of turns of the secondary winding 22 is smaller than the number of turns of the primary winding 21. The number of turns of the primary winding 21 and the number of turns of the secondary winding 22 are set according to the required output voltage.

The main switching element 12 is electrically connected to the primary winding 21 of the transformer 11. The main switching element 12 of the present embodiment is a metal-oxide-semiconductor field-effect transistor (MOSFET). The main switching element 12 may be an insulated-gate bipolar transistor (IGBT). One end of the main switching element 12 is electrically connected to the second end 21*b* of the primary winding 21. The other end of the main switching element 12 is electrically connected to the negative terminal of the direct-current power supply 101. Accordingly, the second end 21*b* of the primary winding 21 is connected to the negative terminal of the direct-current power supply 101 via the main switching element 12.

The rectifier circuit 13 is electrically connected to the secondary winding 22 of the transformer 11. The rectifier circuit 13 includes a positive busbar L1, a negative busbar L2, a first diode 31, and a second diode 32. One end of the positive busbar L1 is a positive input terminal 13*a*. The other end of the positive busbar L1 is a positive output terminal 13*c*. One end of the negative busbar L2 is a negative input terminal 13*b*. The other end of the negative busbar L2 is a negative output terminal 13*d*. The first diode 31 is provided on the positive busbar L1. The anode of the first diode 31 is located on the input side where the positive input terminal 13*a* is located. The cathode of the first diode 31 is located on the output side where the positive output terminal 13*c* is located. The second diode 32 is electrically connected to the positive busbar L1 and the negative busbar L2. The anode of the second diode 32 is electrically connected to the negative busbar L2. The cathode of the second diode 32 is electrically connected between the first diode 31 and the positive output terminal 13*c* on the positive busbar L1.

The third end 22*a* of the secondary winding 22 is electrically connected to the positive input terminal 13*a* of the rectifier circuit 13. The fourth end 22*b* of the secondary winding 22 is electrically connected to the negative input terminal 13*b* of the rectifier circuit 13.

The smoothing circuit 14 is electrically connected to the secondary winding 22 of the transformer 11. The smoothing circuit 14 includes a smoothing reactor 41 and a smoothing capacitor 42. The smoothing reactor 41 includes a smoothing coil 43. The smoothing coil 43 has a fifth end 43*a* and a sixth end 43*b*. The fifth end 43*a* is one end of the smoothing coil 43, and the sixth end 43*b* is the other end of the smoothing coil 43.

The fifth end 43*a* of the smoothing coil 43 is electrically connected to the positive output terminal 13*c* of the rectifier circuit 13. The sixth end 43*b* of the smoothing coil 43 is electrically connected to one end of the smoothing capacitor 42. The other end of the smoothing capacitor 42 is electrically connected to the negative output terminal 13*d* of the rectifier circuit 13. Accordingly, the sixth end 43*b* of the smoothing coil 43 is electrically connected to the negative output terminal 13*d* of the rectifier circuit 13 via the smoothing capacitor 42.

The active clamp circuit 16 includes a clamp capacitor 61 and a clamp switching element 62. The clamp capacitor 61 and the clamp switching element 62 are connected in series. The active clamp circuit 16 is connected in parallel with the primary winding 21. The clamp switching element 62 of the present embodiment is a MOSFET. Instead, the clamp switching element 62 may be an IGBT. One end of the clamp capacitor 61 is electrically connected to the positive terminal of the direct-current power supply 101. The other end of the clamp capacitor 61 is electrically connected to one end of the clamp switching element 62. The other end of the clamp switching element 62 is electrically connected to one end of the main switching element 12.

The control circuit 15 includes a processor and a memory. The processor is, for example, a middle processing unit (CPU), a graphics processing unit (GPU), or a digital signal processor (DSP). The memory includes random access memory (RAM) and a read-only memory (ROM). The memory stores program codes or instructions configured to cause the processor to execute processes. The memory, or a computer-readable medium, includes any type of media that is accessible by general-purpose computers or dedicated computers. The control circuit 15 may include a hardware circuit such as an application-specific integrated circuit (ASIC) or a field-programmable gate array (FPGA). The control circuit 15, which is processing circuitry, may include one or more processors that run according to a computer program, one or more hardware circuits (e.g., ASIC or FPGA), or a combination thereof.

The control circuit 15 regulates the switching operations of the main switching element 12 and the clamp switching element 62. The control circuit 15 alternately turns on and off the main switching element 12 and the clamp switching element 62.

Figure 2:
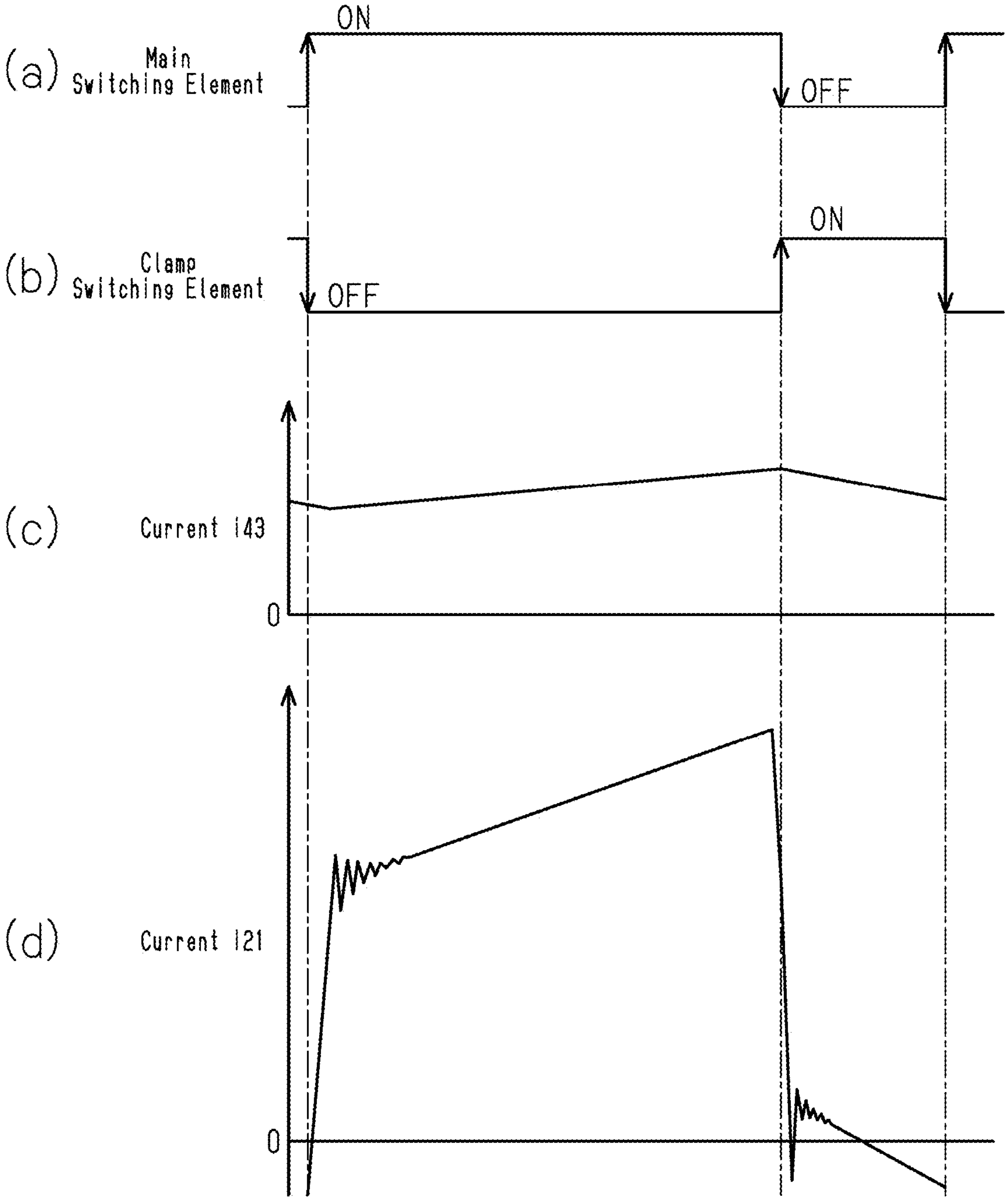
FIG. 2 is a timing diagram in which section (a) indicates the state of the main switching element, section (b) indicates the state of the clamp switching element, section (c) indicates the value of current flowing through the smoothing coil, and section (d) indicates the value of current flowing through the primary winding.

As shown in sections (a) and (b) of FIG. 2, the control circuit 15 turns off the clamp switching element 62 when the main switching element 12 is on. The control circuit 15 turns on the clamp switching element 62 when the main switching element 12 is off. Sections (a) and (b) of FIG. 2 each show an example of a duty cycle. The duty cycle is set according to the required output voltage.

Operation of Converter

A solid arrow R1 in FIG. 1 indicates the flow of current through the converter 10 when the main switching element 12 is on. When the main switching element 12 is on, an exciting current flows from the direct-current power supply 101 to the primary winding 21 of the transformer 11, thereby producing an induced electromotive force on the secondary side of the transformer 11. The induced electromotive force causes current to flow from the secondary winding 22 of the transformer 11, through the first diode 31 and the smoothing reactor 41, to the load 102. In this situation, a current i43 flowing through the smoothing coil 43 causes the smoothing reactor 41 to store energy. Further, a current i21 flowing through the primary winding 21 causes energy to be stored on the primary side of the transformer 11.

A broken arrow R2 in FIG. 1 indicates the flow of current in the converter 10 when the main switching element 12 is off. When the main switching element 12 is off, the smoothing reactor 41 releases its stored energy. Consequently, current flows from the smoothing reactor 41 through the second diode 32 to the load 102. The converter 10 of the present embodiment includes the active clamp circuit 16. Thus, when the main switching element 12 is off, the energy stored on the primary side of the transformer 11 is released.

As shown in section (c) of FIG. 2, after the main switching element 12 is turned on, the current i43 flowing through the smoothing coil 43 gradually increases subsequent to a certain period of time. When the main switching element 12 is off, the current i43 flowing through the smoothing coil 43 gradually decreases.

As shown in section (d) of FIG. 2, when the main switching element 12 is on, the current i21 flows through the primary winding 21. In the present embodiment, when the main switching element 12 is off, the energy stored on the primary side of the transformer 11 is released. Consequently, the current i21 flows through the primary winding 21. That is, in the present embodiment, the current i21 flows through the primary winding 21 not only when the main switching element 12 is on, but also when it is off.

Configuration of Converter

Figure 3:
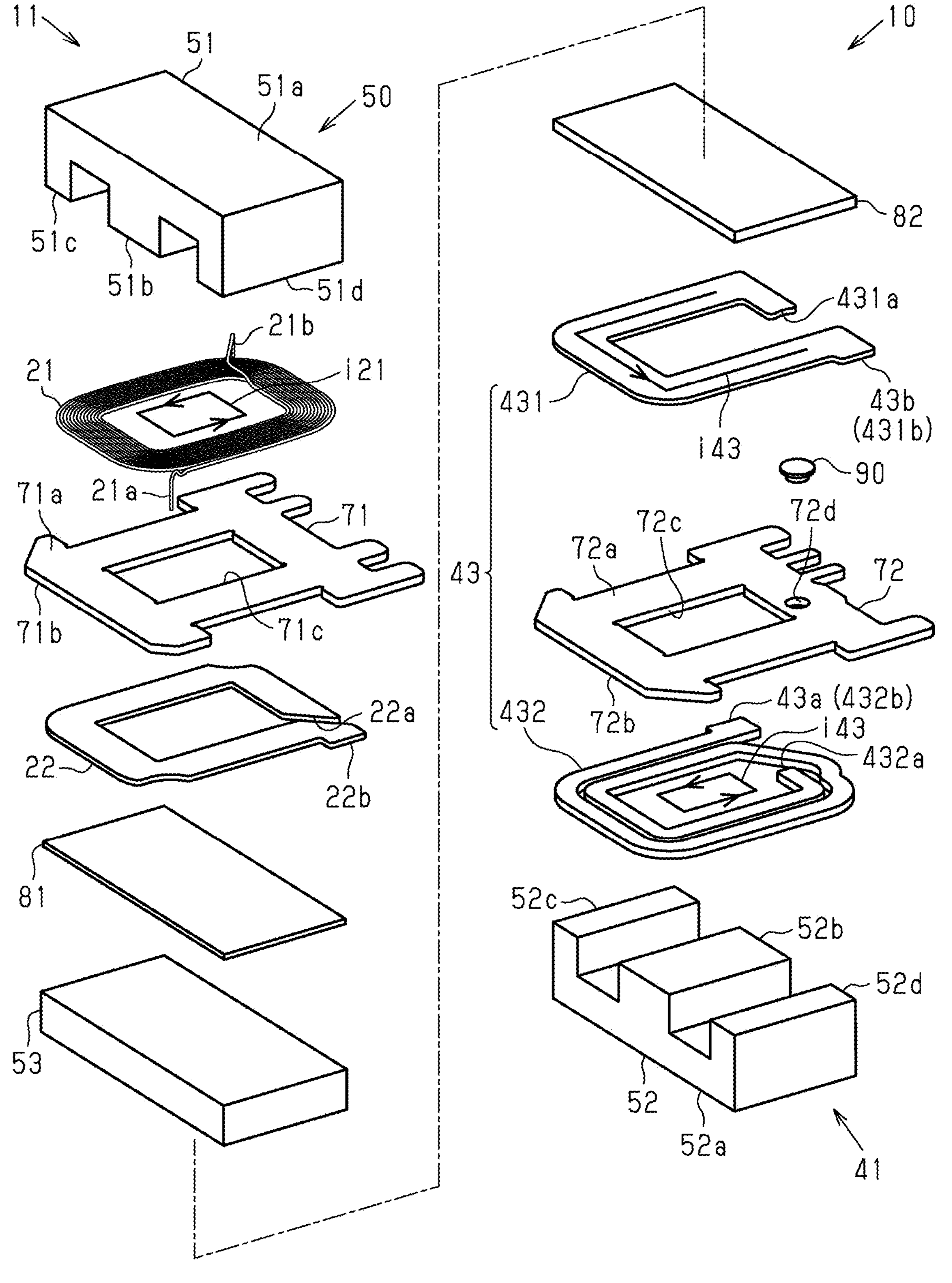
FIG. 3 is an exploded perspective view of the forward DC-DC converter in the embodiment illustrated in FIG. 1.
Figure 4:
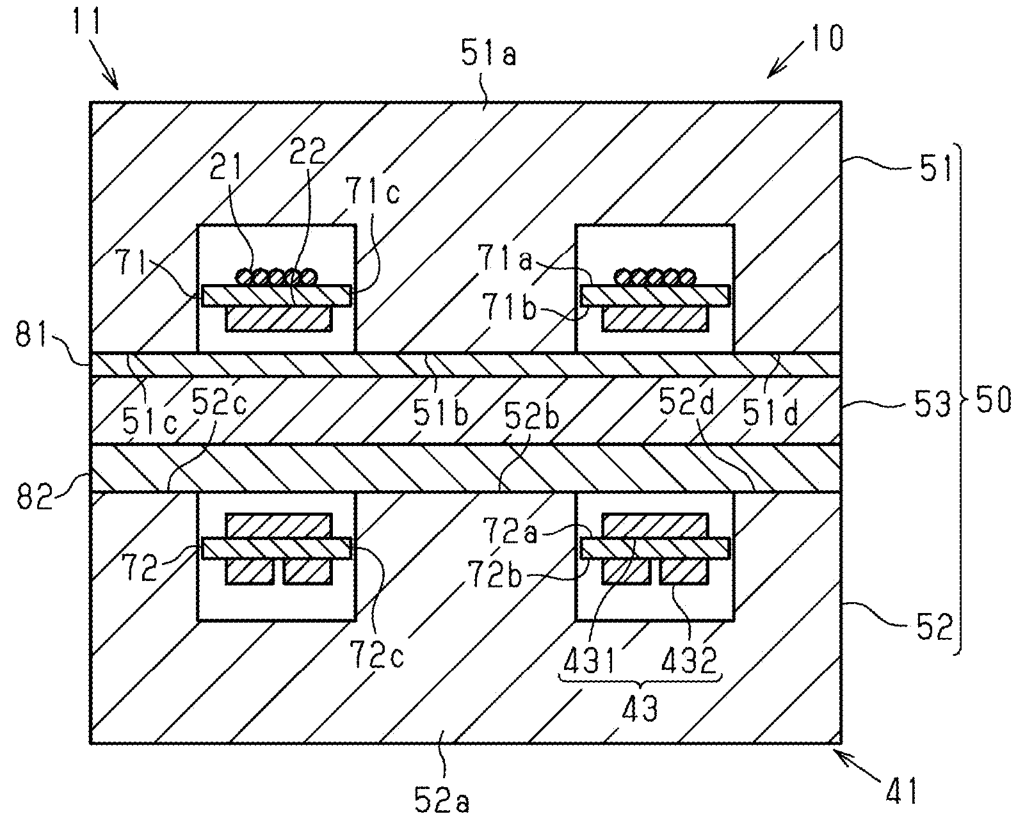
FIG. 4 is a cross-sectional view of the forward DC-DC converter in the embodiment illustrated in FIG. 1.

As shown in FIGS. 3 and 4, the converter 10 includes a core 50, a first circuit board 71, a second circuit board 72, a first gap sheet 81, and a second gap sheet 82.

The primary winding 21 of the present embodiment is formed by winding a conductive wire. The primary winding 21 of the present embodiment is wound with fourteen turns. Since the primary winding 21 is schematically illustrated in FIG. 4, the number of turns of the primary winding 21 shown in FIG. 4 is depicted as fewer than the actual number of turns. The secondary winding 22 in the present embodiment is formed by winding a metal plate. The secondary winding 22 in the present embodiment is wound with one turn. The primary winding 21 and the secondary winding 22 are held on the first circuit board 71. The first circuit board 71 is fixed to a case (not shown). The primary winding 21 is provided on a first surface 71*a* of the first circuit board 71. The secondary winding 22 is provided on a second surface 71*b* of the first circuit board 71.

The first circuit board 71 includes a first middle leg insertion hole 71*c*. The first middle leg insertion hole 71*c* extends through the first circuit board 71 in the thickness direction. The primary winding 21 and the secondary winding 22 are each arranged to surround the first middle leg insertion hole 71*c*.

The smoothing coil 43 includes a first winding 431 and a second winding 432. In the present embodiment, the first winding 431 and the second winding 432 are each formed by winding a metal plate. The first winding 431 is wound with one turn. The second winding 432 is wound with two turns. The first winding 431 and the second winding 432 are held on the second circuit board 72. The second circuit board 72 is fixed to a case (not shown). The first winding 431 is provided on a first surface 72*a* of the second circuit board 72. The second winding 432 is provided on a second surface 72*b* of the second circuit board 72.

The second circuit board 72 includes a second middle leg insertion hole 72*c*. The second middle leg insertion hole 72*c* extends through the second circuit board 72 in the thickness direction. The first winding 431 and the second winding 432 are each arranged to surround the second middle leg insertion hole 72*c*.

The second circuit board 72 includes a through-hole 72*d*. The through-hole 72*d* extends through the second circuit board 72 in the thickness direction. A conductive connection member 90 is inserted into the through-hole 72*d*. The first winding 431 has a first end 431*a* electrically connected to the connection member 90. The second winding 432 has a first end 432*a* electrically connected to the connection member 90. The first winding 431 is electrically connected to the second winding 432 by the connection member 90. Thus, the smoothing coil 43 in the present embodiment is wound with three turns. The first winding 431 has a second end 431*b* that is opposite to the first end 431*a*. The second end 431*b* corresponds to the sixth end 43*b* of the smoothing coil 43. The second winding 432 has a second end 432*b* that is opposite to the first end 432*a*. The second end 432*b* corresponds to the fifth end 43*a* of the smoothing coil 43.

The core 50 of the present embodiment includes a first core component 51, a second core component 52, and a third core component 53. The first core component 51, the second core component 52, and the third core component 53 are separate from each other. That is, the core 50 of the present embodiment includes three core components. The core 50 of the present embodiment is a ferrite core.

The first core component 51 is an E-core. The first core component 51 includes a flat first base 51*a*, a first middle leg 51*b*, and a pair of first outer legs 51*c*, 51*d*. The first middle leg 51*b* and the two first outer legs 51*c*, 51*d* extend from the first base 51*a*. The two first outer legs 51*c*, 51*d* are respectively located on opposite sides of the first middle leg 51*b*. The first circuit board 71 is located between the two first outer legs 51*c*, 51*d*. The first middle leg 51*b* is inserted through the first middle leg insertion hole 71*c* of the first circuit board 71. The first middle leg 51*b* and the two first outer legs 51*c*, 51*d* protrude from the second surface 71*b* of the first circuit board 71.

The primary winding 21 and the secondary winding 22 of the transformer 11 are each wound around the first middle leg 51*b*. Thus, the primary winding 21 and the secondary winding 22 are wound around the core 50. The winding direction of the primary winding 21 from the first end 21*a* toward the second end 21*b* and the winding direction of the secondary winding 22 from the third end 22*a* toward the fourth end 22*b* are identical.

The second core component 52 is an E-core. The second core component 52 includes a flat second base 52*a*, a second middle leg 52*b*, and a pair of second outer legs 52*c*, 52*d*. The second middle leg 52*b* and the second outer legs 52*c*, 52*d* extend from the second base 52*a*. The two second outer legs 52*c*, 52*d* are respectively located on opposite sides of the second middle leg 52*b*. The second circuit board 72 is located between the two second outer legs 52*c*, 52*d*. The second middle leg 52*b* is inserted through the second middle leg insertion hole 72*c* of the second circuit board 72. The second middle leg 52*b* and the second outer legs 52*c*, 52*d* protrude from the first surface 72*a* of the second circuit board 72.

The first winding 431 and the second winding 432 of the smoothing coil 43 are each wound around the second middle leg 52*b*. Thus, the smoothing coil 43 is wound around the second middle leg 52*b* of the core 50. The winding direction of the smoothing coil 43 from the fifth end 43*a* toward the sixth end 43*b* are identical with the winding direction of the primary winding 21 from the first end 21*a* toward the second end 21*b* and the winding direction of the secondary winding 22 from the third end 22*a* toward the fourth end 22*b*.

The third core component 53 is an I-core. The third core component 53 is flat. The third core component 53 is located between the first core component 51 and the second core component 52. Thus, the core 50 of the present embodiment is an EIE core, where the third core component 53 (I-core) is located between the first core component 51 (E-core) and the second core component 52 (E-core). The third core component 53 is an intermediate portion located between the first base 51*a* and the second base 52*a*.

The first middle leg 51*b* and the two first outer legs 51*c*, 51*d* extend from the first base 51*a* toward the third core component 53. The first middle leg 51*b* and the two first outer legs 51*c*, 51*d* are located between the first base 51*a* and the third core component 53. The first gap sheet 81 is located between the first middle leg 51*b* and the third core component 53, as well as between the two first outer legs 51*c*, 51*d* and the third core component 53.

The second middle leg 52*b* and the two second outer legs 52*c*, 52*d* extend from the second base 52*a* toward the third core component 53. The second middle leg 52*b* and the two second outer legs 52*c*, 52*d* are located between the second base 52*a* and the third core component 53. The second gap sheet 82 is located between the second middle leg 52*b* and the third core component 53, as well as between the two second outer legs 52*c*, 52*d* and the third core component 53. In the present embodiment, the second gap sheet 82 is thicker than the first gap sheet 81. This allows the smoothing coil 43 to store more energy.

The end surface of the first middle leg 51*b* faces the end surface of the second middle leg 52*b*, with the first gap sheet 81, the third core component 53, and the second gap sheet 82 located in between. The end surface of the first outer leg 51*c*, which is one of the two first outer legs 51*c*, 51*d*, faces the end surface of the second outer leg 52*c*, which is one of the two second outer legs 52*c*, 52*d*, with the first gap sheet 81, the third core component 53, and the second gap sheet 82 located in between. The end surface of the other first outer leg 51*d* faces the end surface of the other second outer leg 52*d*, with the first gap sheet 81, the third core component 53, and the second gap sheet 82 located in between.

Operation of Present Embodiment

The core 50 includes the first core component 51, the second core component 52, and the third core component 53. The first core component 51 includes the first base 51*a*, the first middle leg 51*b*, and the two first outer legs 51*c*, 51*d*. The second core component 52 includes the second base 52*a*, the second middle leg 52*b*, and the two second outer legs 52*c*, 52*d*. The third core component 53 is the intermediate portion located between the first base 51*a* and the second base 52*a*. The first middle leg 51*b* is located between the first base 51*a* and the third core component 53. The primary winding 21 and the secondary winding 22 are wound around the first middle leg 51*b*. The two first outer legs 51*c*, 51*d* are respectively located on opposite sides of the first middle leg 51*b*, positioned between the first base 51*a* and the third core component 53. The second middle leg 52*b* is located between the second base 52*a* and the third core component 53. The smoothing coil 43 is wound around the second middle leg 52*b*. The two second outer legs 52*c*, 52*d* are respectively located on opposite sides of the second middle leg 52*b*, positioned between the second base 52*a* and the third core component 53.

The first end 21*a* of the primary winding 21 is electrically connected to the positive terminal of the direct-current power supply 101. The second end 21*b* of the primary winding 21 is electrically connected to the negative terminal of the direct-current power supply 101. The third end 22*a* of the secondary winding 22 is electrically connected to the positive input terminal 13*a* of the rectifier circuit 13. The fourth end 22*b* of the secondary winding 22 is electrically connected to the negative input terminal 13*b* of the rectifier circuit 13. The fifth end 43*a* of the smoothing coil 43 is electrically connected to the positive output terminal 13*c* of the rectifier circuit 13. The sixth end 43*b* of the smoothing coil 43 is electrically connected to the negative output terminal 13*d* of the rectifier circuit 13. The winding direction of the primary winding 21 from the first end 21*a* toward the second end 21*b*, the winding direction of the secondary winding 22 from the third end 22*a* toward the fourth end 22*b*, and the winding direction of the smoothing coil 43 from the fifth end 43*a* toward the sixth end 43*b* are identical.

Figure 5:
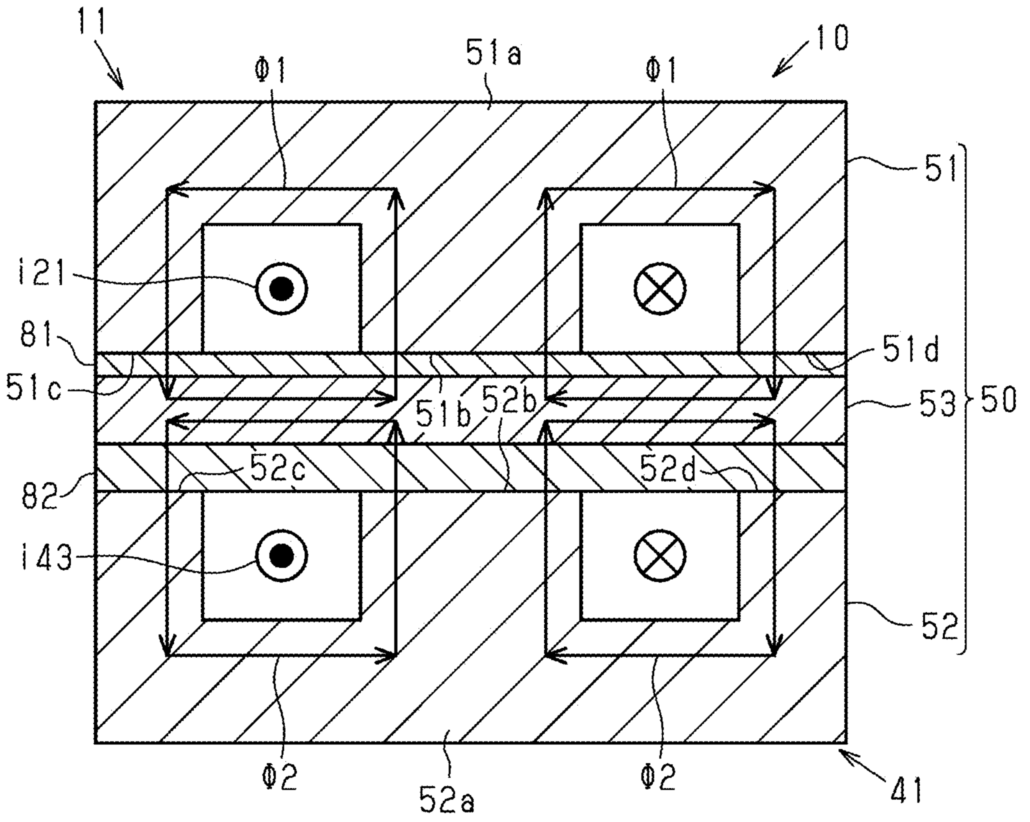
FIG. 5 is a diagram illustrating the operation of the forward DC-DC converter in the embodiment illustrated in FIG. 1.

As shown in FIG. 5, in the present embodiment, the current i21 flowing through the primary winding 21 flows from the rear side toward the front side of the plane of the drawing between the first middle leg 51*b* and one of the first outer legs 51*c*. The current i21 flowing through the primary winding 21 flows from the front side toward the rear side of the plane of the drawing between the first middle leg 51*b* and the other one of the first outer legs 51*d*. Thus, in the core 50, a magnetic flux Φ1, forming a loop, flows from the first middle leg 51*b*, through the first base 51*a*, the first outer leg 51*c*, 51*d*, and the third core component 53 in this order, back to the first middle leg 51*b*. The first core component 51 and the third core component 53 are included in a transformer core through which the magnetic flux Φ1, generated by the current i21 flowing through the primary winding 21, flows.

The current i43 flowing through the smoothing coil 43 flows from the rear side toward the front side of the plane of the drawing between the second middle leg 52*b* and one of the second outer legs 52*c*. The current i43 flowing through the smoothing coil 43 flows from the front side toward the rear side of the plane of the drawing between the second middle leg 52*b* and the other one of the second outer legs 52*d*. Thus, in the core 50, a magnetic flux Φ2, forming a loop, flows from the second middle leg 52*b*, through the third core component 53, the second outer leg 52*c*, 52*d*, and the second base 52*a* in this order, back to the second middle leg 52*b*. The second core component 52 and the third core component 53 are included in a smoothing reactor core through which the magnetic flux Φ2, generated by the current i43 flowing through the smoothing coil 43, flows.

In this manner, the third core component 53 serves as part of the transformer core and part of the smoothing reactor core. This configuration has a smaller number of core components in the core 50 than a configuration in which the transformer core and the smoothing reactor core are individually provided. Thus, the converter 10 is reduced in size.

In the third core component 53, the magnetic fluxes Φ1, Φ2 flow in opposite directions. Thus, in the third core component 53, the magnetic fluxes Φ1, Φ2 cancel out each other, thereby reducing the magnetic flux density of the third core component 53. Accordingly, the magnetic flux density in the third core component 53 is less likely to exceed the upper limit value of the magnetic flux density specified for each material of the core 50. Hence, the third core component 53 is reduced in size. This also reduces the converter 10 in size.

Advantages of Present Embodiment (1) The magnetic flux Φ1, generated by the current i21 flowing through the primary winding 21, flows through the first base 51*a*, the first middle leg 51*b*, and the two first outer legs 51*c*, 51*d* of the first core component 51 and through the third core component 53, which is the intermediate portion. That is, the first core component 51 and the third core component 53 are included in the transformer core. Further, the magnetic flux Φ2, generated by the current i43 flowing through the smoothing coil 43, flows through the second base 52*a*, the second middle leg 52*b*, and the two second outer legs 52*c*, 52*d* of the second core component 52 and through the third core component 53, which is the intermediate portion. That is, the second core component 52 and the third core component 53 are included in the smoothing reactor core. In this manner, the third core component 53, which is the intermediate portion, serves as part of the transformer core and part of the smoothing reactor core. This configuration has a smaller number of core components in the core 50 than the configuration in which the transformer core and the smoothing reactor core are individually provided. Thus, the converter 10 is reduced in size.

Further, in the third core component 53, the magnetic flux Φ1, generated by the current i21 flowing through the primary winding 21, and the magnetic flux Φ2, generated by the current i43 flowing through the smoothing coil 43, flow in opposite directions. Thus, in the third core component 53, the magnetic fluxes Φ1, Φ2 cancel out each other, thereby reducing the magnetic flux density of the third core component 53. As a result, the magnetic flux density in the third core component 53 is less likely to exceed the upper limit value of the magnetic flux density specified for each material of the core 50. Hence, the third core component 53 is reduced in size. This also reduces the converter 10 in size.

Furthermore, the maximum magnetic flux density of the third core component 53 is reduced. Thus, the amount of iron loss is smaller than the total iron loss of the transformer 11 and the smoothing reactor 41 in a configuration in which they are individually provided.

(2) The converter 10 of the present embodiment includes the first circuit board 71, which holds the primary winding 21 and the secondary winding 22, and the second circuit board 72, which holds the smoothing coil 43. This enables the first circuit board 71 to stably hold the primary winding 21 and the secondary winding 22. Additionally, the second circuit board 72 stably holds the smoothing coil 43. In this configuration, the primary winding 21, secondary winding 22, and smoothing coil 43 are held at a lower cost than in a configuration in which each of them are wound around a bobbin.

(3) For example, if the first core component 51 is integrated with the third core component 53, the primary winding 21 and the secondary winding 22 need to be passed through the section between the first middle leg 51*b* and each of the first outer legs 51*c*, 51*d* to wind the primary winding 21 and the secondary winding 22 around the first middle leg 51*b*. In the present embodiment, the first base 51*a*, the first middle leg 51*b*, and the two first outer legs 51*c*, 51*d* are integrated into the first core component 51. The intermediate portion is the third core component 53, which is separate from the first core component 51. Thus, after the primary winding 21 and the secondary winding 22 are wound, the first middle leg 51*b* can be inserted into the wound primary winding 21 and secondary winding 22. This facilitates the winding of the primary winding 21 and the secondary winding 22 around the first middle leg 51*b*.

For example, if the second core component 52 is integrated with the third core component 53, the smoothing coil 43 needs to be passed through the section between the second middle leg 52*b* and each of the second outer legs 52*c*, 52*d* to wind the smoothing coil 43 around the second middle leg 52*b*. In the present embodiment, the second base 52*a*, the second middle leg 52*b*, and the two second outer legs 52*c*, 52*d* are integrated into the second core component 52. The intermediate portion is the third core component 53, which is separate from the second core component 52. Thus, after the smoothing coil 43 is wound, the second middle leg 52*b* can be inserted into the wound smoothing coil 43. This facilitates the winding of the smoothing coil 43 around the second middle leg 52*b*.

(4) The converter 10 of the present embodiment includes the active clamp circuit 16, which is connected in parallel with the primary winding 21 of the transformer 11. Thus, when the main switching element 12 is off, the energy stored on the primary side of the transformer 11 while the main switching element 12 was on is released by the active clamp circuit 16. Thus, the current i21 flows through the primary winding 21 not only when the main switching element 12 is on, but also when it is off. Thus, not only when the main switching element 12 is on, but also when it is off, the magnetic fluxes Φ1, Φ2 cancel out each other, thereby reducing the loss of the third core component 53.

Modifications

The above embodiment may be modified as follows. The above embodiment and the following modifications can be combined as long as the combined modifications remain technically consistent with each other.

The converter 10 may step up the voltage of power from the direct-current power supply 101 and output it to the load 102.

The converter 10 does not have to include the active clamp circuit 16.

The converter 10 does not have to include the first circuit board 71 or the second circuit board 72. In this case, the primary winding 21, secondary winding 22, and smoothing coil 43 are each wound around and held on a bobbin.

The first gap sheet 81 may be omitted. The first middle leg 51*b* and the two first outer legs 51*c*, 51*d* may each be in contact with the third core component 53. The omission of the first gap sheet 81 reduces manufacturing costs.

Figure 6:
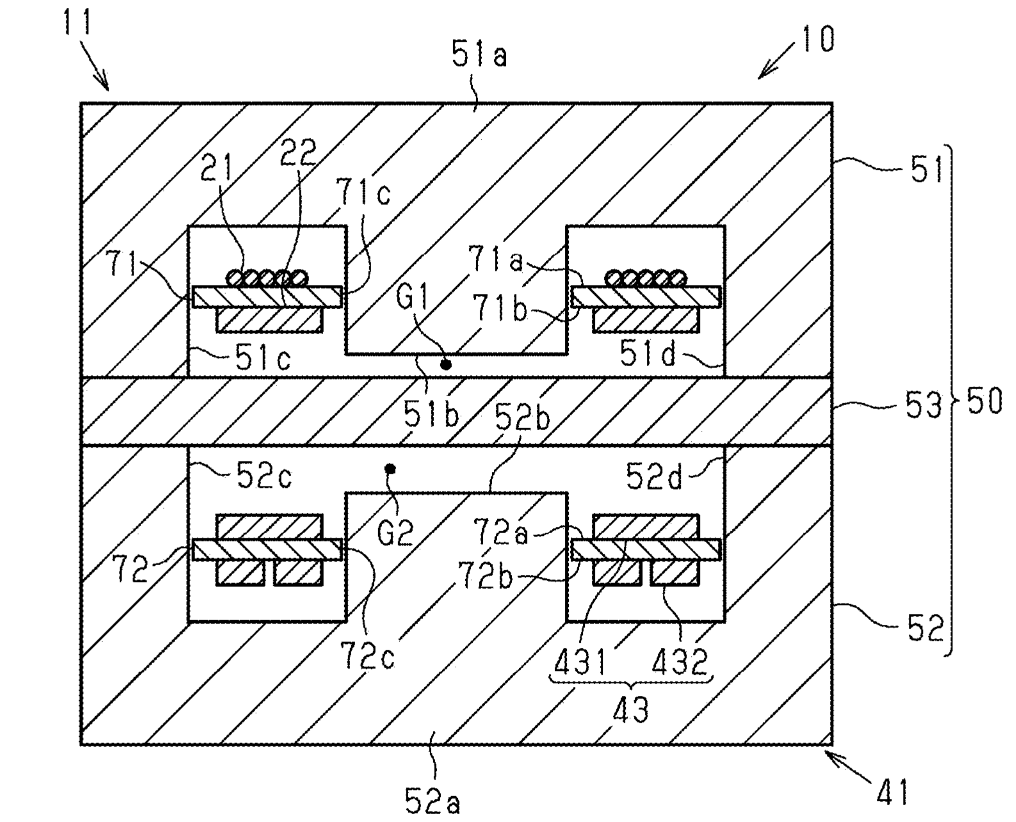
FIG. 6 is a cross-sectional view of the forward DC-DC converter according to a modification.

As shown in FIG. 6, a gap G1 may be provided between the first core component 51 and the third core component 53 instead of the first gap sheet 81. Specifically, the first middle leg 51*b* of the first core component 51 is made shorter than the first outer legs 51*c*, 51*d*. This creates the gap G1 between the first middle leg 51*b* and the third core component 53. The two first outer legs 51*c*, 51*d* are in contact with the third core component 53. The omission of the first gap sheet 81 reduces manufacturing costs.

As shown in FIG. 6, a gap G2 may be provided between the second core component 52 and the third core component 53 instead of the second gap sheet 82. Specifically, the second middle leg 52*b* of the second core component 52 is made shorter than the second outer legs 52*c*, 52*d*. This creates the gap G2 between the second middle leg 52*b* and the third core component 53. The gap G2 between the second middle leg 52*b* and the third core component 53 is larger than the gap G1 between the first middle leg 51*b* and the third core component 53. The two second outer legs 52*c*, 52*d* are in contact with the third core component 53. The omission of the second gap sheet 82 reduces manufacturing costs.

The first core component 51 and the second core component 52 are not limited to an EE core. Instead, the first core component 51 and the second core component 52 may be, for example, an EER core or a PQ core.

The third core component 53 is not limited to an I-core.

Figure 7:
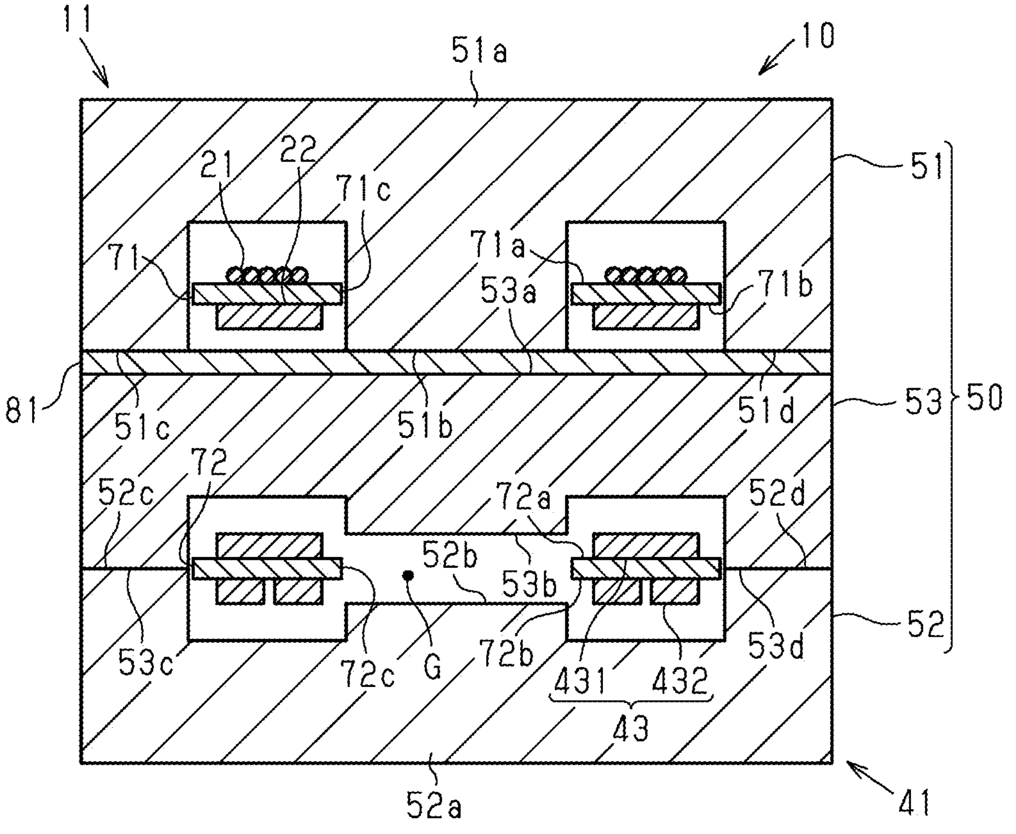
FIG. 7 is a cross-sectional view of the forward DC-DC converter according to another modification.

As shown in FIG. 7, the third core component 53 may be an E-core. The third core component 53 includes a flat third base 53*a*, a third middle leg 53*b*, and two third outer legs 53*c*, 53*d*. The third middle leg 53*b* and the two third outer legs 53*c*, 53*d* extend from the third base 53*a*. The two third outer legs 53*c*, 53*d* are respectively located on opposite sides of the third middle leg 53*b*.

The first gap sheet 81 is provided between the first core component 51 and the third core component 53. Specifically, the first gap sheet 81 is located between the first middle leg 51*b* of the first core component 51 and the third base 53*a* of the third core component 53, as well as between the two first outer legs 51*c*, 51*d* and the third base 53*a*. The second gap sheet 82 is not located between the second core component 52 and the third core component 53. The second middle leg 52*b* is shorter than the second outer legs 52*c*, 52*d*. The third middle leg 53*b* is shorter than the third outer legs 53*c*, 53*d*. This creates a gap G between the second middle leg 52*b* of the second core component 52 and the third middle leg 53*b* of the third core component 53. The two second outer legs 52*c*, 52*d* of the second core component 52 are in contact with the two third outer legs 53*c*, 53*d* of the third core component 53, respectively.

In the above configuration, the third base 53*a* corresponds to the intermediate portion. The second middle leg 52*b* and the third middle leg 53*b* correspond to the second middle leg. The two second outer legs 52*c*, 52*d* and the two third outer legs 53*c*, 53*d* correspond to the two second outer legs.

The second core component 52 is not limited to an E-core. For example, when the third core component 53 is an E-core, the second core component 52 may be an I-core. In this case, the third base 53*a* corresponds to the intermediate portion. The third middle leg 53*b* corresponds to the second middle leg. The two third outer legs 53*c*, 53*d* correspond to the two second outer legs. The second core component 52 corresponds to the second base.

The core 50 does not have to include three core components.

For example, the third core component 53 may be integrally molded with the first core component 51 and may be separate from the second core component 52. That is, part of the transformer core may serve as part of the smoothing reactor core. In this case, the core 50 includes two core components.

In this configuration, the third core component 53 is separate from the second core component 52. Thus, after the smoothing coil 43 is wound, the second middle leg 52*b* can be inserted into the wound smoothing coil 43. This facilitates the winding of the smoothing coil 43 around the second middle leg 52*b*.

For example, the third core component 53 may be integrally molded with the second core component 52 and may be separate from the first core component 51. That is, part of the smoothing reactor core may serve as part of the transformer core. In this case, the core 50 includes two core components.

In this configuration, the third core component 53 is separate from the first core component 51. Thus, after the primary winding 21 and the secondary winding 22 are wound, the first middle leg 51*b* can be inserted into the wound primary winding 21 and secondary winding 22. This facilitates the winding of the primary winding 21 and the secondary winding 22 around the first middle leg 51*b*.

In short, the winding process is relatively easy if the third core component 53 is separate from at least one of the first core component 51 and the second core component 52. The phrase "at least one of the first core component 51 and the second core component 52" refers to only the first core component 51, only the second core component 52, or both the first core component 51 and the second core component 52.

The primary winding 21 may be formed by winding a metal plate.

The secondary winding 22 may be formed by winding a conductive wire.

The first winding 431 and the second winding 432 may each be formed by winding a conductive wire.

The smoothing coil 43 may be formed by winding a single conductive wire or a single metal plate.

The smoothing coil 43 may be formed by winding and electrically connecting three or more wires or three or more metal plates.

The number of turns of the smoothing coil 43 may be changed.

The configuration of the rectifier circuit 13 may be changed.

For example, the first diode 31 may be replaced with a first rectification switching element such as a MOSFET. The second diode 32 may be replaced with a second rectifying switching element such as a MOSFET. In this case, the control circuit 15 controls the switching operations of the first and second rectifying switching elements. When the main switching element 12 is on, the control circuit 15 turns on the first rectification switching element and turns off the second rectification switching element. When the main switching element 12 is off, the control circuit 15 turns off the first rectification switching element and turns on the second rectification switching element.

For example, the first diode 31 may be provided on the negative busbar L2. The anode of the first diode 31 is located on the output side where the negative output terminal 13*d* is located. The cathode of the first diode 31 is located on the input side where the negative input terminal 13*b* is located.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A forward DC-DC converter, comprising:

a transformer including a primary winding and a secondary winding;

a switching element electrically connected to the primary winding;

a rectifier circuit electrically connected to the secondary winding;

a smoothing reactor including a smoothing coil, the smoothing coil being electrically connected to the secondary winding;

a core around which the primary winding, the secondary winding, and the smoothing coil are wound;

a first circuit board that holds the primary winding and the secondary winding; and a second circuit board that holds the smoothing coil, wherein the core includes:

a first base;

a second base;

an intermediate portion located between the first base and the second base;

a first middle leg which is located between the first base and the intermediate portion and around which the primary winding and the secondary winding are wound;

two first outer legs located respectively on opposite sides of the first middle leg between the first base and the intermediate portion;

a second middle leg which is located between the second base and the intermediate portion and around which the smoothing coil is wound; and two second outer legs located respectively on opposite sides of the second middle leg between the second base and the intermediate portion, one end of the primary winding is a first end electrically connected to a positive electrode of a direct-current power supply, and the other end of the primary winding is a second end electrically connected to a negative electrode of the direct-current power supply, one end of the secondary winding is a third end electrically connected to a positive input terminal of the rectifier circuit, and the other end of the secondary winding is a fourth end electrically connected to a negative input terminal of the rectifier circuit, one end of the smoothing coil is a fifth end electrically connected to a positive output terminal of the rectifier circuit, and the other end of the smoothing coil is a sixth end electrically connected to a negative output terminal of the rectifier circuit, and a winding direction of the primary winding from the first end toward the second end, a winding direction of the secondary winding from the third end toward the fourth end, and a winding direction of the smoothing coil from the fifth end toward the sixth end are identical.

2. The forward DC-DC converter according to claim 1, wherein the core includes:

a first core component including the first base, the first middle leg, and the two first outer legs;

a second core component including the second base, the second middle leg, and the two second outer legs; and a third core component corresponding to the intermediate portion, and the third core component is separate from at least one of the first core component and the second core component.

3. The forward DC-DC converter according to claim 1, further comprising:

an active clamp circuit connected in parallel with the primary winding.

* * * * *